(12) United States Patent
Tong et al.

(10) Patent No.: US 6,674,209 B2
(45) Date of Patent: Jan. 6, 2004

(54) METHOD FOR INCREASING SUBTRANSIENT REACTANCE OF A GENERATOR

(75) Inventors: Wei Tong, Clifton Park, NY (US); Frederick John Rink, Jr., Clifton Park, NY (US); James Michael Fogarty, Schenectady, NY (US); John Wesley Griffith, Schenectady, NY (US); Christian Lee Vandervort, Voorheesville, NY (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 10/101,393

(22) Filed: Mar. 20, 2002

(65) Prior Publication Data

US 2002/0121830 A1 Sep. 5, 2002

Related U.S. Application Data

(62) Division of application No. 09/728,919, filed on Dec. 1, 2000.

(51) Int. Cl.$^7$ .................................................. H02K 3/48
(52) U.S. Cl. ......................... 310/214; 310/43; 310/215
(58) Field of Search ................. 29/596, 598; 310/214, 310/216, 215, 43, 45, 203, 259, 258

(56) References Cited

U.S. PATENT DOCUMENTS

| 2,201,699 A | * | 5/1940 | Myers ......................... 171/252 |
| 3,093,764 A | * | 6/1963 | King et al. .................. 310/214 |
| 3,437,858 A | * | 4/1969 | White .......................... 310/214 |
| 3,447,009 A | * | 5/1969 | Keuth et al. ................. 310/214 |
| 3,976,902 A | * | 8/1976 | Simmonds ................... 310/214 |
| 4,025,840 A | | 5/1977 | Brissey et al. |
| 4,607,183 A | * | 8/1986 | Rieber et al. ................ 310/214 |
| 4,761,580 A | | 8/1988 | Hein et al. |
| 4,761,581 A | * | 8/1988 | Watanabe et al. ............ 310/214 |
| 4,827,597 A | | 5/1989 | Hein et al. |
| 4,857,788 A | | 8/1989 | Hein et al. |
| 5,214,839 A | * | 6/1993 | Rieber et al. .................. 29/596 |
| 5,252,877 A | | 10/1993 | Sawa et al. |
| 5,258,681 A | | 11/1993 | Hibino et al. |

FOREIGN PATENT DOCUMENTS

| EP | 0 052 878 | 6/1982 | |
| EP | 0 292 617 | 12/1988 | |
| EP | 0 493 603 | 7/1992 | |
| JP | 357189542 A | * 11/1982 | .................. 310/214 |

* cited by examiner

*Primary Examiner*—Thanh Lam
(74) *Attorney, Agent, or Firm*—Nixon & Vanderhye PC (57) ABSTRACT

A magnetic armature wedge is provided for replacing conventional dovetail wedges in high-powered large-size turbine generators. The magnetic armature wedges that are used for supporting the armature bars are made by molding resin, e.g., epoxy with ferromagnetic particles, wires, laminates and the like embedded therewithin. The magnetic particles, wires, laminates and the like increase the magnetic permeability of the wedges causing higher slot flux leakage and high generator subtransient reactants.

18 Claims, 6 Drawing Sheets

METHOD FOR INCREASING SUBTRANSIENT REACTANCE OF A GENERATOR

This application is a division of application Ser. No. 09/728,919, filed Dec. 1, 2000, the entire content of which is hereby incorporated by reference in this application.

BACKGROUND OF THE INVENTION

Subtransient reactance is the relative measurement (%) of the internal impedance of a generator. For most common generators, its value ranges between about 15 and 20%. Customers often require generators with high subtransient reactance to limit fault currents during sudden short circuits.

The internal product specification for a new generator design usually specifies a minimum subtransient reactance (generally 14%) to ensure normal operation. The generator designer can usually design a generator to satisfy the product specification but sometimes at the cost of a larger generator.

Occasionally, a customer requests a subtransient reactance higher than what the generator was designed for. In such cases, the generator could be redesigned to meet the customer's requirements, but the cost of doing so would be unacceptably high. There is a need, therefore, for a way to increase generator subtransient reactance without having to redesign the entire generator. It is also a requirement, however, that any such modifications not increase the losses, or reduce the generator efficiency. Generator armature temperatures should remain the same or be reduced, and the mechanical strength of the stator should be increased to minimize the vibration or winding motion.

Some previous attempts at increasing generator subtransient reactance include either depressing the coil sides in the slot, or increasing the number of turns to result in more flux linkages and, therefore, higher reactance. Both these approaches required redesign of the armature winding. The modified or redesigned winding may not have as much copper as possible, and so may have higher losses on temperatures.

SUMMARY OF THE INVENTION

In an embodiment of the invention, the armature wedges on units requiring higher subtransient reactance are replaced with molded wedges that have magnetic material embedded therewithin.

Subtransient reactance consists of six components: (1) armature slot leakage reactance; (2) zig-zag leakage reactance; (3) armature leakage reactance due to phase belts; (4) armature end winding leakage reactance; (5) armature leakage reactance due to peripheral leakage flux; and (6) equivalent subtransient rotor reactance per phase of stator direct axis. Among these, the armature slot leakage reactance accounts for about 40% of subtransient reactance. Therefore, an effective way for increasing subtransient reactance would be to increase the armature slot leakage reactance.

Conventional armature coil slot wedges serve to contain the armature bars in the slots. A wedge slide with a varying thickness is inserted between the armature wedge and the top filler to tightly hold all armature coil components inside the slot. By redesigning the armature wedge and/or the slide as a so-called "magnetic flux bridge", the armature slot leakage flux can be significantly increased and, in turn, the armature slot leakage reactance can be increased.

Thus, the invention provides a way to increase the leakage flux in the region between the top of the upper armature and the top of the slot without increasing the slot depth.

Accordingly, the invention is embodied in a magnetic assembly for being received in an armature slot for retaining armature coil components therewithin, the assembly having a longitudinal dimension generally parallel to an axis of the armature slot and a thickness dimension in a direction generally perpendicular to the longitudinal dimension and aligned in a depth direction the armature slot, the magnetic assembly comprising: a magnetic armature wedge structure including a molded body of a resin material having a magnetic material embedded therewithin, the magnetic material being embedded in the molded body so as to be disposed along substantially an entire length thereof. In the presently preferred embodiment, the magnetic assembly, further comprises a magnetic wedge slide adjacent the magnetic armature wedge structure, between the magnetic armature wedge structure and the armature coil components, the magnetic wedge slide being formed from resin having ferromagnetic particles distributed therethrough.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
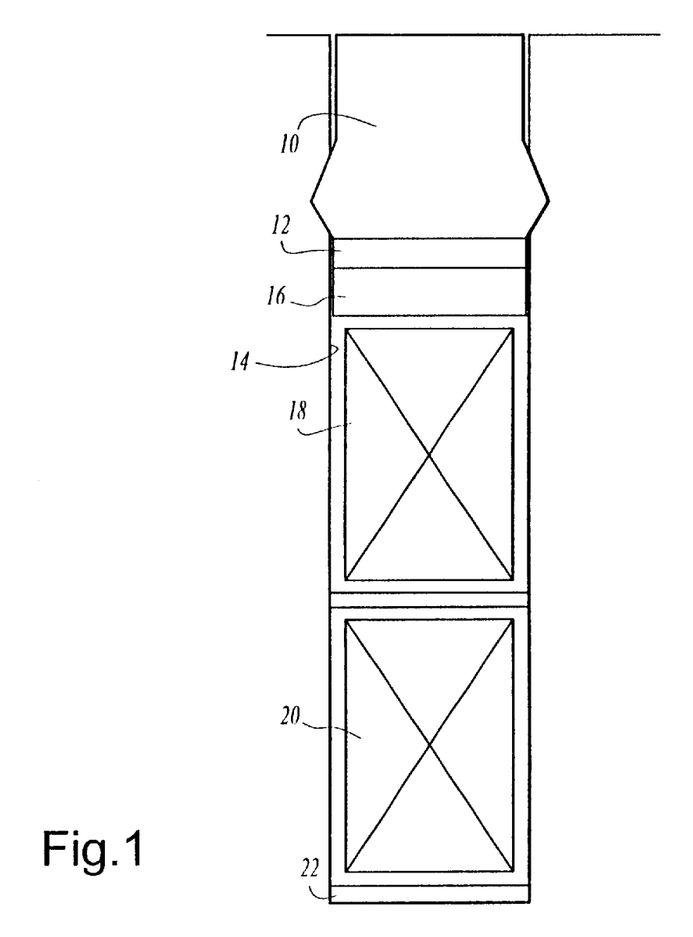
FIG. 1 is a schematic cross-sectional view of a stator magnetic flux bridge wedge in position in an embodiment of the invention.

As shown in FIG. 1, as an embodiment of the invention, a magnetic assembly is fitted into the upper part of an armature slot 14. The magnetic assembly has a longitudinal dimension generally parallel to an axis of the armature slot 14 and a thickness dimension in a direction generally perpendicular to the longitudinal dimension and aligned with a depth direction the armature slot. In the illustrated embodiment the magnetic assembly is composed of a magnetic armature wedge 10 and a wedge slide 12 that is also preferably formed at least in part from a magnetic material. As is conventional, the wedge slide 12 is inserted between the armature wedge 10 and the top filler 16 to tightly hold all the armature coil components, namely the top stator bar 18, the bottom stator bar 20, and the bottom slot filler 22 inside the slot 14. The magnetic armature wedge structure 10 includes a molded body of a resin material having a magnetic material embedded therewithin. As will be apparent from the exemplary embodiments discussed below, the magnetic material is embedded in the molded body so as to be disposed along substantially an entire length thereof. The fully filled armature slot 14 with the magnetic wedge 10 can increase not only the effective height of the magnetic flux bridge but also reduce the rotating body windage loss on the rotor surface.

Figure 2:
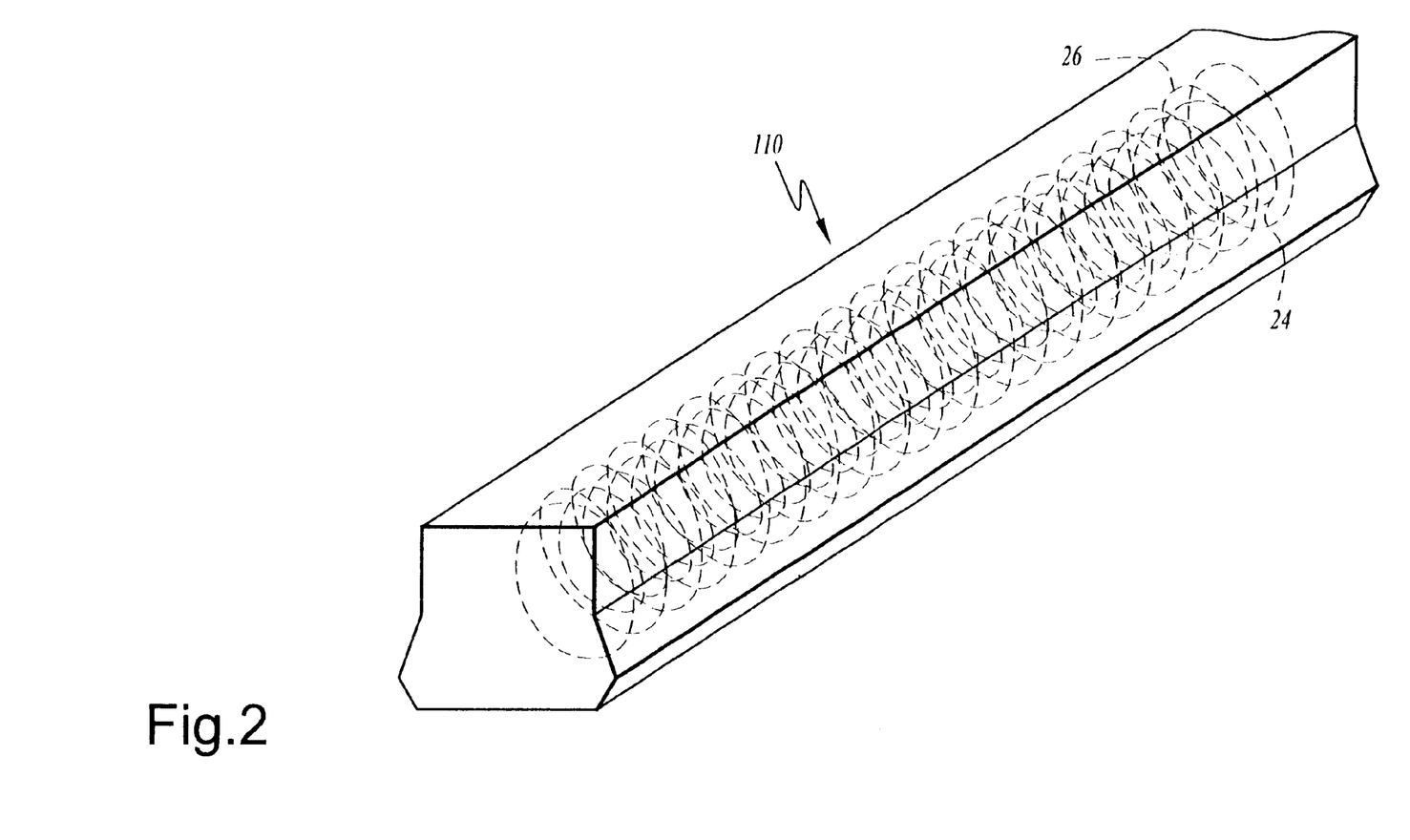
FIG. 2 is a schematic perspective view of a magnetic armature wedge with oppositely wound helical wires as an embodiment of the invention.

A number of alternative designs of the magnetic armature wedge are proposed as embodiments of the invention. A first exemplary embodiment of the magnetic armature wedge 110 is illustrated in FIG. 2. In this embodiment, a pair of helical silicon-iron wires 24, 26 serve to enhance the magnetic flux. The two wires are wound oppositely and connected at their ends. In this way, eddy currents induced in each wire have an opposite direction and will tend to cancel each other. This will reduce any stray magnetic fields due to the spiral structure of the wires.

Figures 3, 4:
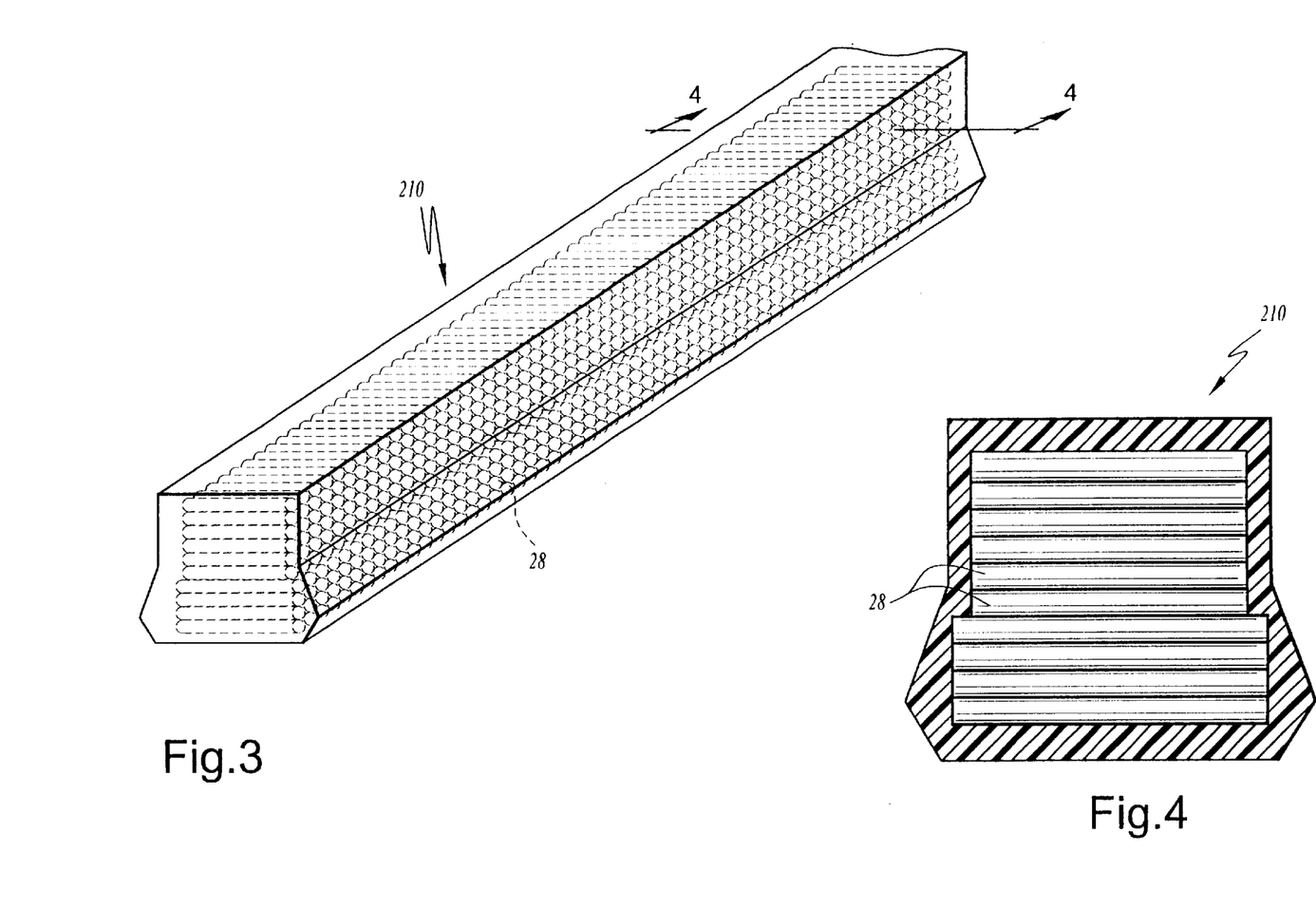
FIG. 3 is a schematic perspective view of an alternative magnetic flux bridge wedge having small diameter sticks as an embodiment of the invention.
FIG. 4 is a view taken along line 4—4 of FIG. 3.
Figures 5, 6:
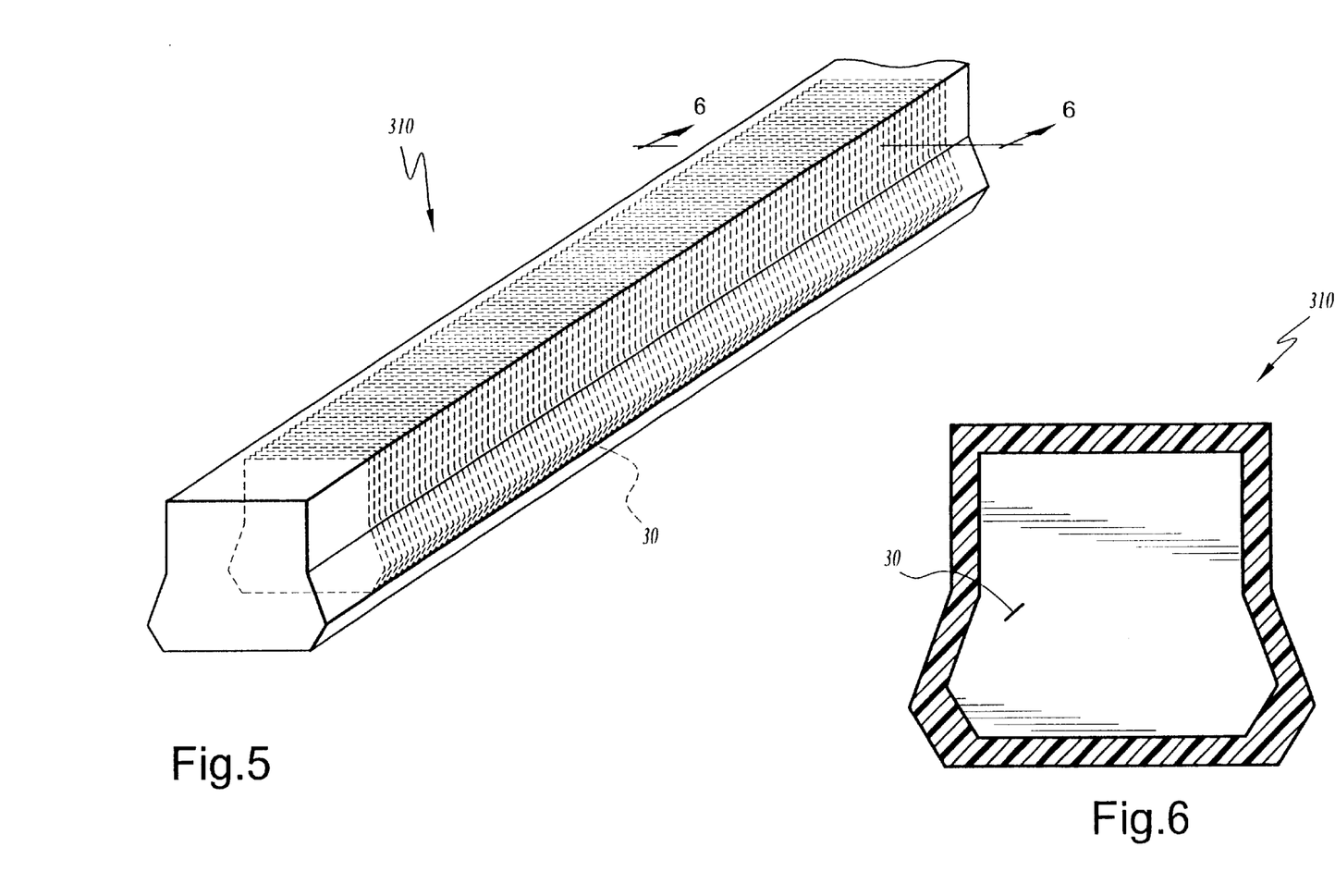
FIG. 5 is a schematic perspective view of a further alternate design of magnetic flux bridge wedge embodying the invention.
FIG. 6 is a view taken along line 6—6 of FIG. 5.

Another alternate configuration of the magnetic armature wedge 210, using small diameter silicon-iron sticks 28 to increase slot leakage reactance, is illustrated in FIGS. 3 and 4. To reduce the eddy currents in these sticks 28, the stick surfaces are advantageously coated with non-metallic material prior to being embedded into the molded wedge 210. In FIGS. 5 and 6, silicon-iron laminates 30 are provided in the molded resin wedge 310 instead of the sticks 28 shown in FIGS. 3 and 4, for the same purposes.

Figures 7, 8:
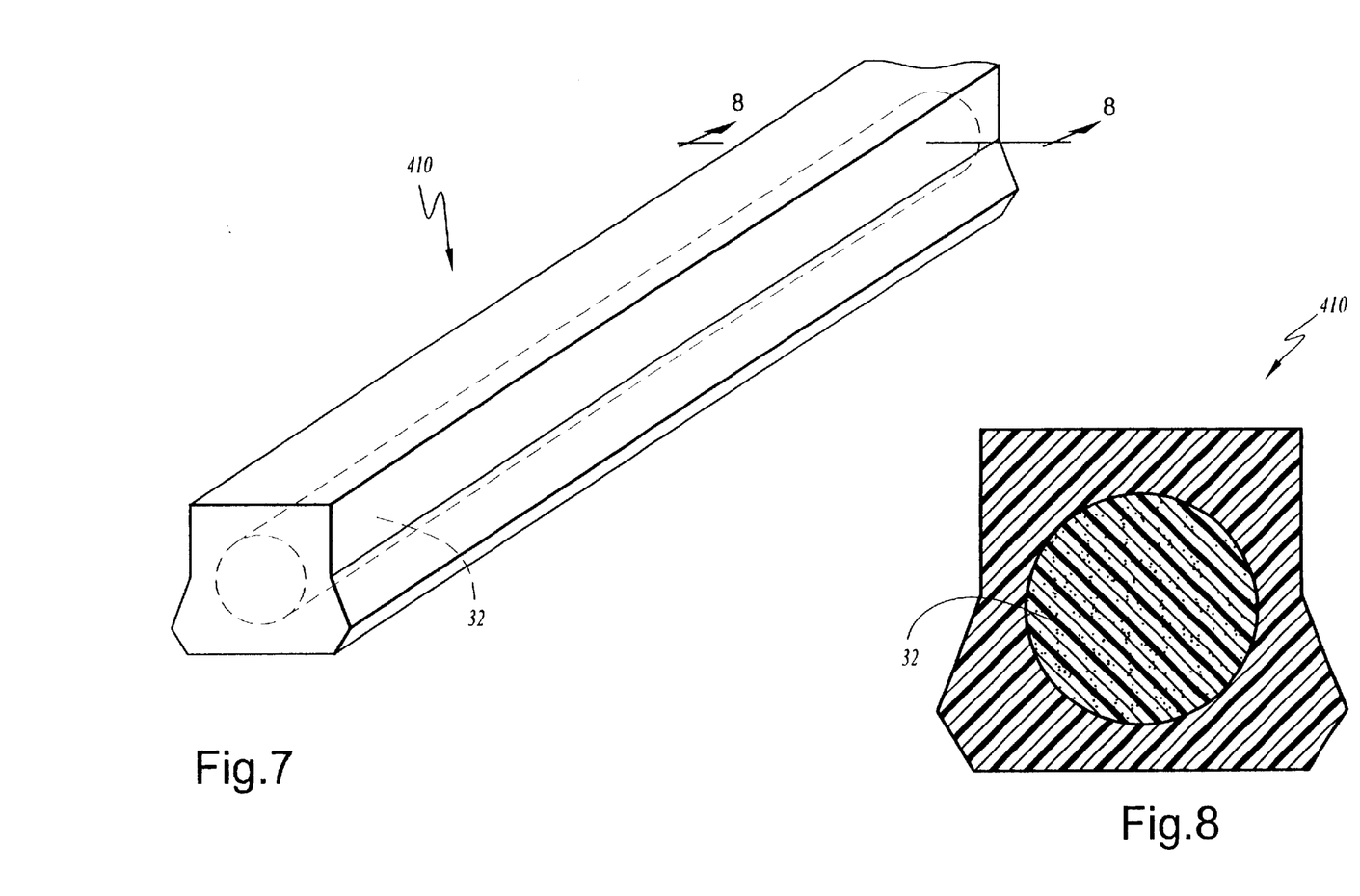
FIG. 7 is a schematic perspective view of another alternate magnetic flux bridge wedge embodying the invention.
FIG. 8 is a schematic cross-sectional view taken along line 8—8 of FIG. 7.

A fourth alternate embodiment of the invention is illustrated in FIGS. 7–8. In this embodiment, a magnetic core 32 made from mixing resin and ferromagnetic particles is encapsulated inside the molded resin wedge 410. The cross-sectional shape of the magnetic core 32 may be varied as desired from the circular core illustrated. However, a circular core is presently preferred for attaining high productivity.

Figure 9:
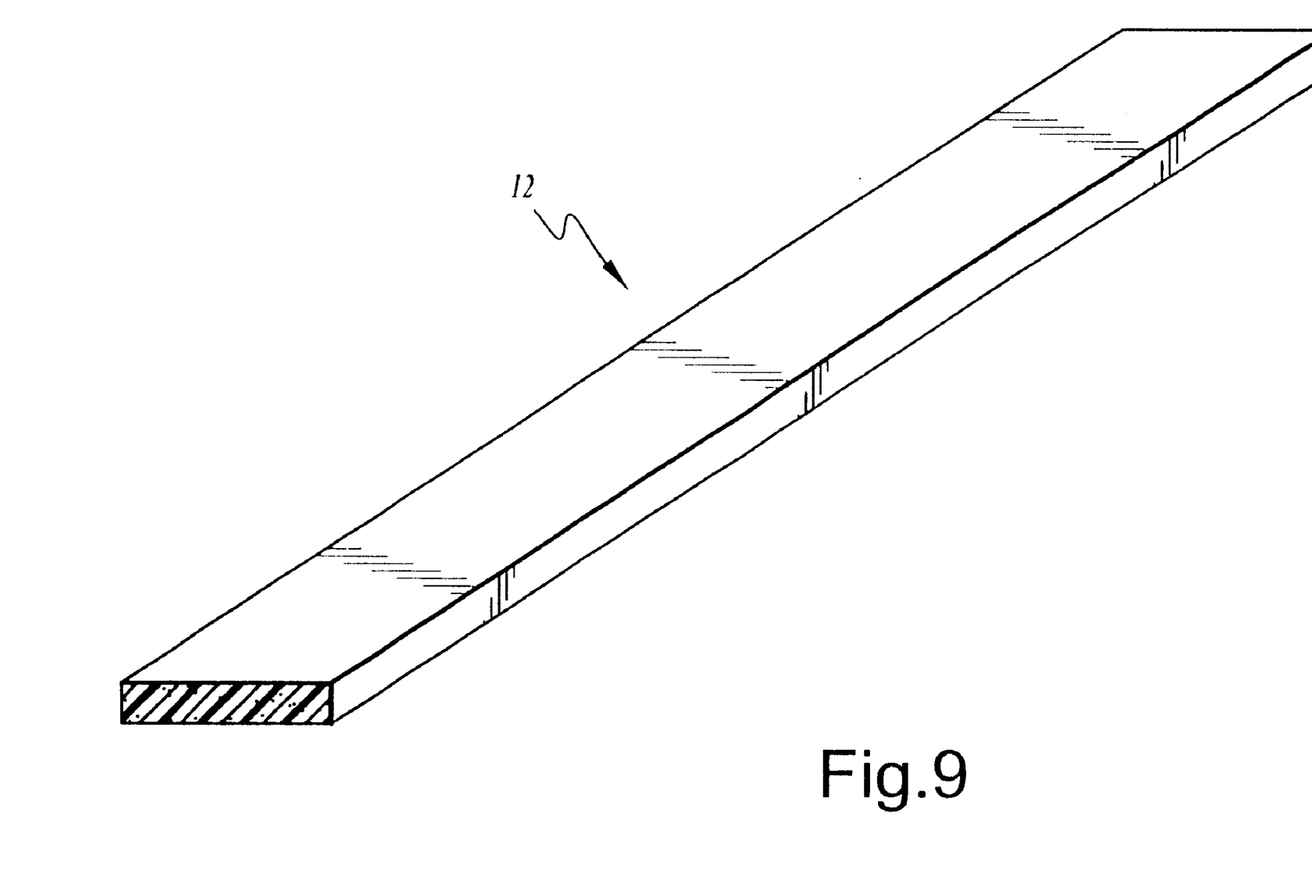
FIG. 9 is a fragmentary perspective view of a magnetic wedge slide embodying the invention.

With any of the magnetic armature wedge embodiments illustrated or similar such magnetic armature wedges, the magnetic wedge slide 12 can be made simply by mixing ferromagnetic particles with resin (e.g., epoxy), as $$\eta_{mag} = \frac{V_{mag}}{V_{mag} + V_{resin}}$$

illustrated in FIG. 9. The volumetric mixing ratio is defined as the volume of ferromagnetic particle to the total volume. That is, Where $V_{mag}$ and $V_{resin}$ are the volumes of the magnetic particles and resin, respectively, and $\eta_{mag}$ can vary from 20 to 80%, depending upon the customer's requirements for subtransient reactance and the mechanical properties of the wedge.

Since the magnetic wedge and slide can each be molded, the manufacturing processes for the magnetic wedges are rather easy and simple and, thus, the reliability will be improved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of increasing generator subtransient reactance in a circumferential direction comprising disposing a magnetic assembly including providing at least one of a magnetic armature wedge structure and a magnetic wedge slide in an armature slot for retaining armature coil components therewithin, thereby defining a magnetic flux bridge to increase armature slot leakage flux in said circumferential direction and thereby increase armature slot leakage reactance in said circumferential direction.

2. A method of increasing generator subtransient reactance in a circumferential direction comprising disposing a magnetic assembly induding providing at least one of a magnetic armature wedge structure and a magnetic wedge slide in an armiature slot for retaining armature coil components therewithin, thereby defining a magnetic flux bridge to increase armature slot leakage flux in said circumferential direction and thereby increase armature slot leakage reactance in said circumferential direction, wherein said step of providing a magnetic armature wedge structure comprises providing a molded wedge having a core of magnetic material disposed to extend along a substantial length thereof and a resin part encapsulating the magnetic core.

3. A method as in claim 2, wherein said magnetic core encapsulated in said resin part of said magnetic armature wedge structure comprises a pair of oppositely wound wires attached at respective ends.

4. A method as in claim 2, wherein said magnetic core encapsulated in said resin part of said magnetic armature wedge structure comprises a plurality of sticks of silicon/iron for increasing slot leakage reactance in said circumferential direction.

5. A method as in claim 4, wherein each said stick is coated with a non-metallic material prior to being embedded in the molded body.

6. A method as in claim 2, wherein said magnetic core encapsulated in said resin part of said magnetic armature wedge structure comprises a plurality of laminated plates of magnetic material, each formed from silicon/iron for increasing slot leakage reactance in said circumferential direction.

7. A method of increasing generator subtransient reactance comprising disposing a magnetic assembly including providing at least one of a magnetic armature wedge structure and a magnetic wedge slide in an armature slot for retaining armature coil components therewithin, thereby defining a magnetic flux bridge to increase armature slot leakage flux and thereby increase armature slot leakage reactance, wherein said step of providing a magnetic armature wedge structure comprises providing a molded wedge having a core of magnetic material and a resin part encapsulating the magnetic core, wherein said magnetic core encapsulated in said resin part of said magnetic armature wedge structure comprises an elongated, centrally disposed magnetic core made from mixing resin and ferromagnetic particles.

8. A method as in claim 7, wherein the volumetric mixing ratio of the magnetic core is between 20 and 80%.

9. A method as in claim 7, wherein said magnetic core is circular in cross-section.

10. A method of increasing generator subtransient reactance in a circumferential direction comprising disposing a magnetic assembly including providing at least one of a magnetic armature wedge structure and a magnetic wedge slide in an armature slot for retaining armature coil components therewithin, thereby defining a magnetic flux bridge to increase armature slot leakage flux in said circumferential direction and thereby increase armature slot leakage reactance in said circumferential direction, wherein said magnetic wedge slide is formed from resin having ferromagnetic particles distributed therethrough, to increase subtransient reactance.

11. A method as in claim 10, wherein said step of providing a magnetic armature wedge structure comprises providing a molded wedge having a core of magnetic material and a resin part encapsulating the magnetic core.

12. A method as in claim 11, wherein said magnetic core encapsulated in said resin part of said magnetic armature wedge structure comprises a pair of oppositely wound wires attached at respective ends.

13. A method as in claim 11, wherein said magnetic core encapsulated in said resin part of said magnetic armature wedge structure comprises a plurality of sticks of silicon/iron for increasing slot leakage reactance in said circumferential direction.

14. A method as in claim 13, wherein each said stick is coated with a non-metallic material prior to being embedded in the molded body.

15. A method as in claim 11, wherein said magnetic core encapsulated in said resin part of said magnetic armature wedge structure comprises a plurality of laminated plates of magnetic material, each formed from silicon/iron for increasing slot leakage reactance in said circumferential direction.

16. A method as in claim 11, wherein said magnetic core encapsulated in said resin part of said magnetic armature wedge structure comprises an elongated, centrally disposed magnetic core made from mixing resin and ferromagnetic particles.

17. A method as in claim 16, wherein said magnetic core is circular in cross-section.

18. A method as in claim 16, wherein the volumetric mixing ratio of the magnetic core is between 20 and 80%.

* * * * *

UNITED STATES PATENT AND TRADEMARK OFFICE
CERTIFICATE OF CORRECTION

PATENT NO. : 6,674,209 B2
DATED : January 6, 2004
INVENTOR(S) : Tong et al.

It is certified that error appears in the above-identified patent and that said Letters Patent is hereby corrected as shown below:

Column 4,
Line 8, delete "induding" and insert -- including --.
Line 10, delete "armiature" and insert -- armature --.

Signed and Sealed this

Twenty-ninth Day of June, 2004

JON W. DUDAS
*Acting Director of the United States Patent and Trademark Office*